United States Patent [19]
Leonard

[11] 3,908,506
[45] Sept. 30, 1975

[54] DIATONIC AND CHROMATIC CHORD DIAL

[76] Inventor: Verna M. Leonard, 6351 N. Blackstone, Fresno, Calif. 93710

[22] Filed: Feb. 22, 1974

[21] Appl. No.: 444,897

[52] U.S. Cl. ................................................ 84/471
[51] Int. Cl.² ......................................... G09B 15/02
[58] Field of Search ............................ 84/470–485; 235/88

[56] References Cited
UNITED STATES PATENTS

| | | | |
|---|---|---|---|
| 428,806 | 5/1890 | Donovan | 84/474 |
| 765,937 | 7/1904 | Reese | 84/480 |
| 1,017,045 | 2/1912 | French et al. | 84/480 |
| 1,431,972 | 10/1922 | Mears | 84/474 |
| 1,467,032 | 9/1923 | Florence | 84/474 |
| 3,289,324 | 12/1966 | Benson | 235/78 M |
| 3,395,600 | 8/1968 | Leonard | 84/478 |

*Primary Examiner*—Lawrence R. Franklin
*Attorney, Agent, or Firm*—Ralph S. Branscomb

[57] ABSTRACT

A device for teaching music students the correspondence between the scale tone intervals of a chord as measured with reference to the chromatic scale and the diatonic scale.

The teaching aid comprises an outer disc and a concentrically and rotatably mounted inner disc, the outer disc having a continuous peripheral display of the chord symbols of a particular chord in the various key signatures, and the inner disc having two preferably radially stepped portions having thereon peripheral displays of the diatonic and chromatic scale intervals of the particular chord. The student rotates the inner disc until the chromatic scale indicia are adjacent to a particular chord symbol on the outer disc and writes in the names of the scale tones of the chord, and then repeats the process for the diatonic scale.

The two discs may be mounted on a backing panel having the actual spaces between the piano keys indicated on the bottom portion for display directly on a piano keyboard.

1 Claim, 2 Drawing Figures

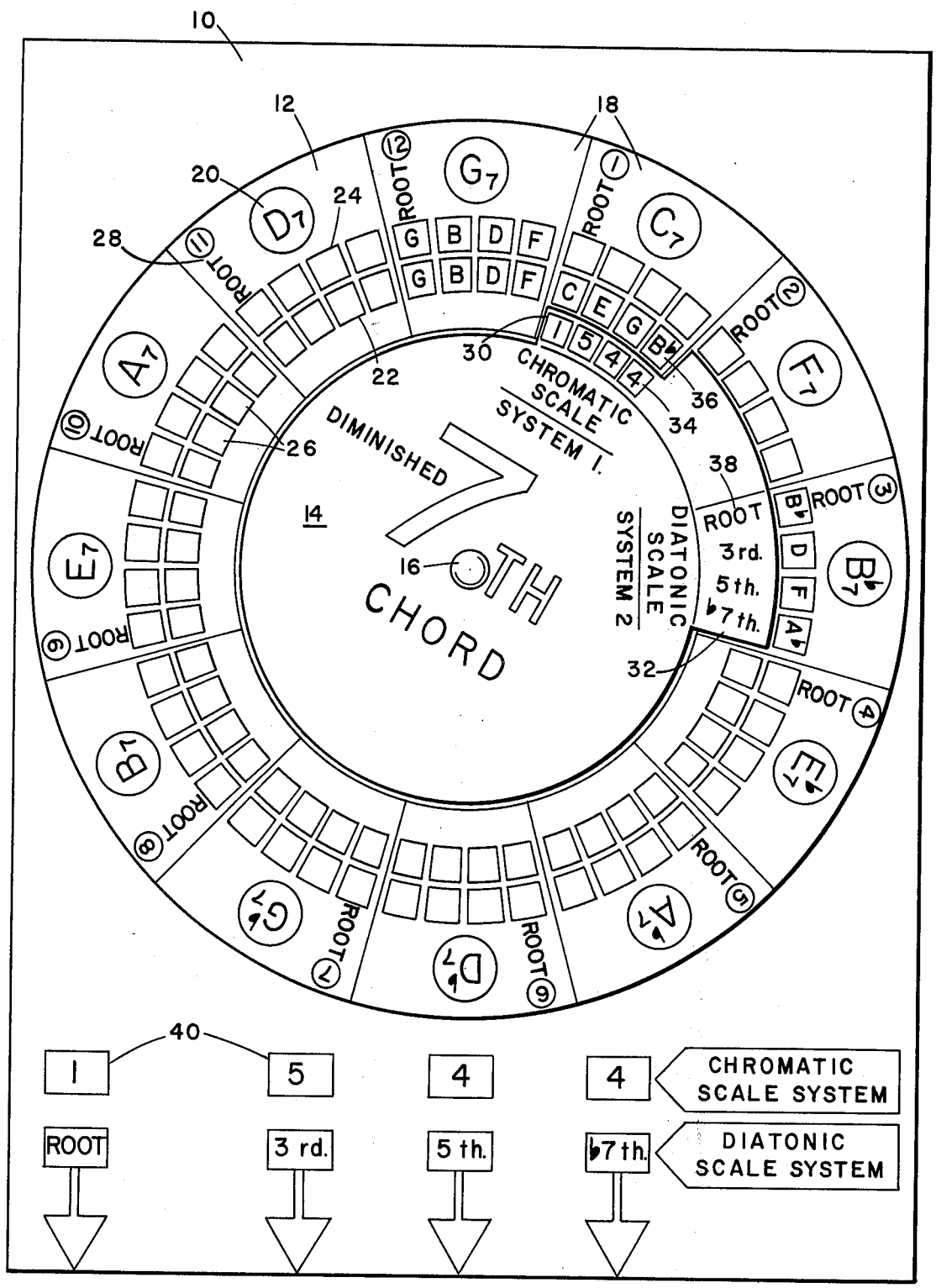
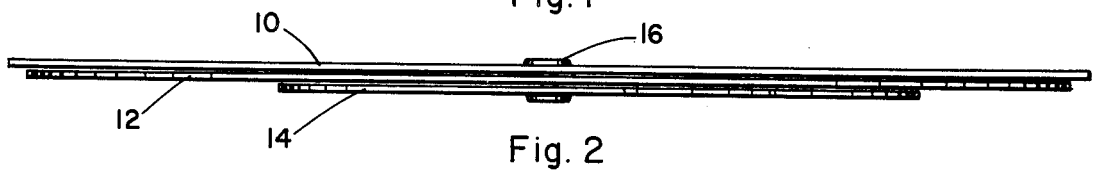
Fig. 1
Fig. 2

DIATONIC AND CHROMATIC CHORD DIAL

BACKGROUND OF THE INVENTION

The invention is in the field of musical teaching aids which may be used by the student without requiring the presence of an instructor. More particularly the student is taught the correspondence between the intervals between scale tones of a chord when measured in reference to the chromatic scale, and when referred to the diatonic scale.

There are many teaching aids and piano instruction publications in current use which teach among other things chord structure, and to impress upon the student the fact that the intervals between the scale tones of a particular chord are unvarying regardless of the key signature in which the chord is played, the individual scale tones in the chord, or the intervals therebetween, are numbered according to one of several numbering systems. As the student moves from one music course to the next, he becomes confused if a different numbering system is used and his grasp of chord structure may be undermined.

SUMMARY OF THE INVENTION

It is the purpose of the present invention to clarify the relationship in the student's mind between the several scale tone interval numbering systems.

Two concentrically and pivotally connected discs are provided, the back disc having a greater radius than the front disc and having around its visible periphery a series of angularly spaced representations of the names of a particular chord in the various key signatures. Radially inwardly of these representations is an annular writing space, substantially visible around the front disc, which is preferably provided with two concentric annular rows of empty squares. The spaces are arranged such that each of the named chords has, in sufficient spatial proximity to be associated therewith, a number of boxes in each row identical to the number of scale tones in the particular chord.

The inner disc has one portion which is extended adjacent to the inner row of boxes and has the scale tone intervals in the chromatic scale system displayed thereon in angular succession. A second portion extends beyond the first row of boxes to align with the second row and has similarly displayed thereon the scale degrees in the diatonic scale system.

In use, the student adjusts the inner disc to align the chromatic scale interval notation with the boxes of a particular named chord, and writes in the correct scale tone names in the boxes. The inner disc is then further adjusted to similarly align the diatonic scale interval notation, thereby covering the previously written in scale tone names and re-writes the scale tone names in the outer boxes. He can then compare what he has written, which should be two identical chords as expressed in their scale tone names.

The two discs may be mounted on a back panel which at the bottom has the chromatic and diatonic intervals written in lateral spaced sequence to correspond with the appropriate keys on a piano keyboard when the device is placed thereon.

BRIEF DESCRIPTION OF THE DRAWINGS

FIG. 1 is a front elevational view of the chord dial and

FIG. 2 is an edge view of the dial from above.

DETAILED DESCRIPTION OF THE PREFERRED EMBODIMENT

The invention comprises a support or backing panel 10, a rear disc 12, and a planar member 14 which will be called the front disc for convenience despite its deviation from a circular shape. All of these parts can be made of ordinary paper, with the two discs being rotably mounted at the center of the rear disc to the backing panel 10 by a rivet or brad 16.

Each individual model of the device relates to one particular type of chord only, which in the illustrated embodiment is the dominant seventh. Other versions using other chords could be provided, and it is intended that the illustrated model be only one unit of an entire set.

The rear disc 12 has in peripherally arranged segments 18 a plurality of indicia 20 which name the particular type of chord, the dominant seventh as shown, in a variety of different key signatures. Preferably all 12 key signatures are represented and are arranged consecutively in the cycle of fourths as illustrated.

Radially inwardly of the chord names 20 is a writing space which will be filled in by the student with scale tone names as explained hereinafter. It is preferred that two concentric rows 22 and 24 of blank squares 26 be displayed in the writing space to organize the inscription of scale tones. The number of boxes in each row in each of the segments 18 should be identical to the number of scale tones in the particular chord used, which is four in the model illustrated reflecting the four-tone structure of the diminished seventh chord. The indicia 20 may also identify the root tone of the chord and the number position of the particular key signature in the cycle of fourths as at 28.

The front disc 14 has a first portion 30 and a second portion 32, both of which preferably have arcuate outer edges which are in radially stepped relationship with one another such that the first extends to the inner periphery of the inner periphery of the inner row 22 of boxes and the second portion extends beyond the first row to the edge of the outer row 24. Additional rows of squares and disc portions could obviously be added should it be desired to include more than two chord interval numbering systems.

The device as proposed herein correlates the chromatic scale system with the diatonic scale system. It is standard practice when using the chromatic scale system to identify the first scale tones of a chord as 1 and indicate for each subsequent tone the number of chromatic scale steps which that tone is above the preceeding tone, counting each starting point as 1. Thus the indicia 34 on the first portion of the front dial indicates that in a dominant seventh chord the second tone is five chromatic steps above the first tone, the third is four steps above the second tone, and the fourth tone is four chromatic steps above the third tone.

The student can thus juxtapose the chromatic scale tone indicia 34 with the squares of a particular key signature and write in the scale tone names by counting up the chromatic scale as has been done at 36 for the C seventh chord.

Tone intervals are expressed differently in the diatonic scale, the first tone of the chord being called 1 or the "root" tone, and subsequent tones being numbered in terms of diatonic scale steps from the root, counting the root itself as one step. These internal notations are called "scale degrees."

The second portion 32 of the front dial is provided with indicia 38 denoting the scale degrees or the number of the diatonic steps from the root tone for each subsequent tone. In a manner similar to the chromatic scale system, the student, by knowing the diatonic scale, fills in the squares in the outer row 24 for any desired key signature, as has been done for a B flat seventh.

Working with the chromatic scale system first, the student is able to cover up any work he has done in any particular key signature with the second portion of the disc, and fill in the scale tone names using the diatonic scale without "cheating" by seeing his previous work. Then the front disc can be rotated to expose both rows of squares, as illustrated for the seventh chord, to check his work. The inscribed scale tones in the two rows should of course be identical, as shown for the G seventh chord.

It should be clear that the position of the diatonic and chromatic scale systems could be switched, and that the rows 22 and 24 could display ordering indicia other than squares.

To enable the student to clearly understand the tone intervals and scale degrees in relationship to the actual physical spacing of the keys of a piano which constitute the particular chord hand position, accurately spaced displays of both the chromatic scale intervals and the diatonic scale degrees may be shown, as at 40, with or without arrows to more precisely point out the individual keys.

I claim:

1. A teaching aid for correlating diatonic and chromatic scale intervals comprising:

a disc having in peripherally arranged segments, a plurality of arrays of indicia naming a particular type of chord in a like number of key signatures, two radially adjacent annular concentric rows of spaced blank squares being provided radially inwardly of said arrays of indicia for the inscription in duplicate of the names of the scale tones of the chords denoted by said arrays, the individual squares of each of said rows being in radial alignment with the individual squares of the other of said rows;

a planar member mounted centrally for rotative adjustment on said disc and having a major portion extending a radial distance from the central mounting thereof short of the inner row of said rows of squares, a first arcuate edged portion the edge of which falls substantially into alignment with the inner margin of the inner row of squares and a second arcuate edged portion adjacent the first portion the edge of which extends over the inner row of squares and falls substantially into alignment with the inner margin of the outer row of squares;

one of said arcuate edged portions having indicia adjacent the edge thereof denoting the chromatic scale tone intervals of the scale tones of said named particular type of chord, the chromatic scale indicia being arranged such that the scale intervals denoted thereon can be moved into individual juxtaposition with a number of squares upon proper rotative adjustment of said planar member;

the other of said arcuate edged portions having indicia adjacent the edge thereof denoting the diatonic scale tone intervals of the scale tones of said named particular type of chord, the diatonic scale indicia being arranged such that the scale intervals denoted thereon can be moved into individual justaposition with a like number of squares upon proper rotative adjustment of said planar member.

* * * * *